US007944857B2

(12) United States Patent
Banerjee et al.

(10) Patent No.: US 7,944,857 B2
(45) Date of Patent: May 17, 2011

(54) METHOD AND SYSTEM FOR DERIVING TUNNEL PATH INFORMATION IN MPLS NETWORKS

(75) Inventors: Swapnesh Banerjee, Karnataka (IN); Akash Deep, Karnataka (IN); Swamy Jagannadha Mandavilli, Karnataka (IN); Kotilingareddy Bhavanam, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 107 days.

(21) Appl. No.: 12/391,271

(22) Filed: Feb. 24, 2009

(65) Prior Publication Data
US 2010/0177772 A1 Jul. 15, 2010

(30) Foreign Application Priority Data
Jan. 12, 2009 (IN) ........................ 87/2009

(51) Int. Cl.
*H04L 12/28* (2006.01)
*H04L 12/56* (2006.01)

(52) U.S. Cl. .................................. 370/255; 370/395.5
(58) Field of Classification Search .......... 370/252–255, 370/395.5, 400, 401
See application file for complete search history.

(56) References Cited

U.S. PATENT DOCUMENTS

| 6,665,273 | B1* | 12/2003 | Goguen et al. | 370/252 |
|---|---|---|---|---|
| 7,082,102 | B1* | 7/2006 | Wright | 370/229 |
| 7,643,434 | B2* | 1/2010 | Mandavilli et al. | 370/254 |
| 7,701,940 | B2* | 4/2010 | Novello et al. | 370/390 |
| 2003/0046427 | A1* | 3/2003 | Goringe et al. | 709/242 |
| 2006/0092941 | A1* | 5/2006 | Kusama | 370/392 |
| 2008/0219272 | A1* | 9/2008 | Novello et al. | 370/401 |

* cited by examiner

*Primary Examiner* — Hong Cho

(57) ABSTRACT

Presented is a method and system for deriving the path of a traffic engineering tunnel in a network using Multi Protocol Label Switching, MPLS, traffic engineering and a Management Information Base, MIB, describing managed objects of the network. The method comprises: obtaining node connectivity information from the MIB; obtaining network connectivity information from a network node manager; and deriving tunnel path information based on the node connectivity information and the network connectivity information.

8 Claims, 4 Drawing Sheets

METHOD AND SYSTEM FOR DERIVING TUNNEL PATH INFORMATION IN MPLS NETWORKS

RELATED APPLICATIONS

Benefit is claimed under 35 U.S.C. 119(a)-(d) to Foreign application Serial No. 87/CHE/2009 entitled "METHOD AND SYSTEM FOR DERIVING TUNNEL PATH INFORMATION IN MPLS NETWORKS" by Hewlett-Packard Development Company, L.P., filed on 12 Jan. 2009, which is herein incorporated in its entirety by reference for all purposes.

BACKGROUND

In computer networking and telecommunications, Multi Protocol Label Switching (MPLS) is a known data-carrying mechanism that belongs to the family of packet-switched networks. MPLS operates at an Open Systems Interconnection (OSI) Model layer that is generally considered to lie between traditional definitions of Layer 2 (Data Link Layer) and Layer 3 (Network Layer), and is therefore commonly referred to as a "Layer 2.5" protocol. MPLS can be used to carry many different kinds of traffic, including IP packets, as well as native ATM, SONET, and Ethernet frames.

MPLS Traffic Engineering (MPLS TE) is the process of selecting and reserving a path between the nodes so as to optimize the network resources, in order to provide improved bandwidth utilization and Quality of Service (QoS). Thus, Traffic Engineering (TE) is particularly important for service provider backbones, and where there are single or multiple paths (tunnels) in a network for the transmission of packets. Such tunnels are typically configured by the network administrator.

The path of a tunnel is a crucial factor which affects the tunnel performance and status. For certain types of tunnels starting from network devices, path information may not be complete or available. Consequently, a network operator or administrator will have a limited insight into the tunnel route through the various network nodes and, thus, cannot accurately determine the source(s) of potential problems. Also, since tunnel path information is important for monitoring tunnel health, network management is made less accurate and more difficult.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
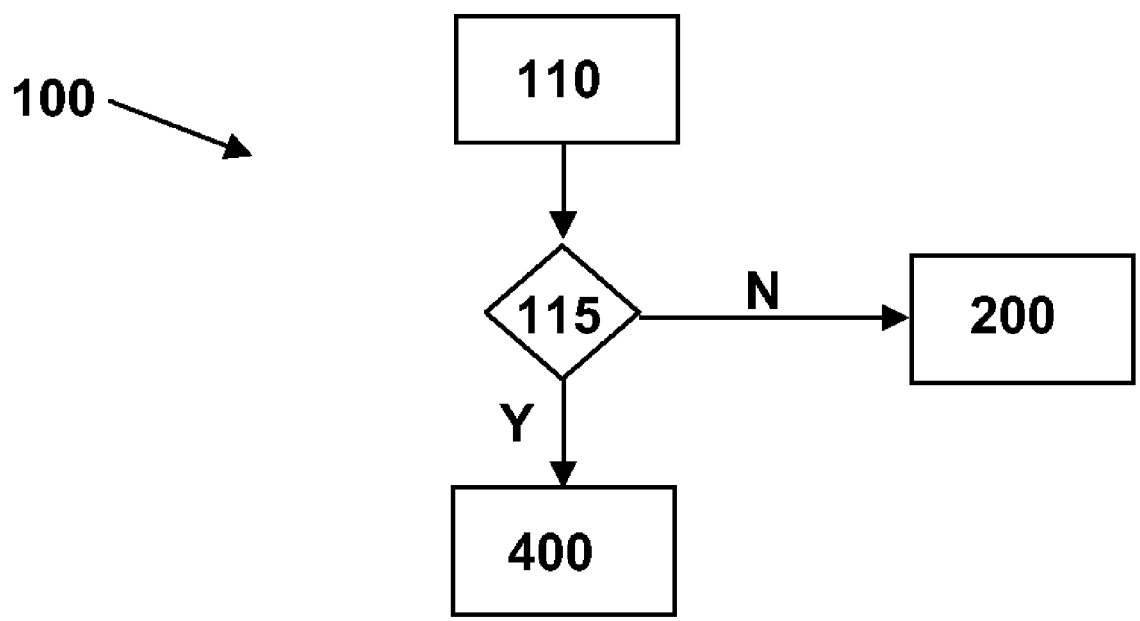
FIG. 1 is a flow diagram of a method according to an embodiment of the invention.

Embodiments combine data from a Management Information Base (MIB) available in the network elements with network connectivity data in order to derive connectivity between nodes of the network. Thus, connectivity between nodes, and path computation of the tunnel(s) providing such connectivity, may be achieved even in the case of missing MIB data.

Management Information Bases (MIBs) are used with network management protocols in the Internet community. A MIB stems from the OSI/ISO (International Organization for Standardization) Network management model and is a type of database used to manage devices in a communications network. A MIB comprises a collection of objects in a (virtual) database or information store used to manage entities (such as routers and switches) in a network.

The database is hierarchical (tree-structured) and entries are addressed through object identifiers. Internet documentation RFCs discuss MIBs, notably RFC 1155, "Structure and Identification of Management Information for TCP/IP based internets", and its two companions, RFC 1213, "Management Information Base for Network Management of TCP/IP-based internets", and RFC 1157, "A Simple Network Management Protocol".

MIB objects are generally accessed using the Simple Network Management Protocol (SNMP), which provides a known communication protocol between management stations, such as consoles, and managed objects (MIB objects), such as routers, gateways, and switches. Components controlled by the management console may therefore require a so-called SNMP agent—a software module that can communicate with the SNMP manager.

Objects in a MIB are typically defined using the mechanisms defined in the Structure of Management Information (SMI) standard.

A MIB may comprise managed objects for modeling MPLS traffic engineering (MPLS TE). Such a MIB may therefore support configuration of point-to-point (or node-to-node) tunnels, and enable tunnel establishment via a MPLS signaling protocol wherein tunnel parameters are specified using the MIB at the head end of the Label Switched Path (LSP) and end-to-end tunnel LSP establishment is accomplished via signalling. MIB objects for performing such actions comprise tables, and more particularly tunnel computed (mplsTunnelCHopTable) and actual (mplsTunnelARHopTable) hop tables for soure routed MPLS tunnel hops.

The tunnel computed-hop table (mplsTunnelCHopTable), hereinafter referred to as the "CHop Table", lists the actual hops computed by a constraint-based routing algorithm based on the mplsTunnelHopTable for the MPLS signalling protocol in use. The support of this table is optional since not all implementations may support computation of hop list using a constraint-based routing protocol. However, it is generally present in Cisco™ nodes.

The tunnel actual-hop table (mplsTunnelARHopTable), hereinafter referred to as the "ARHop Table", is used to indicate the actual hops traversed by a tunnel as reported by the MPLS signaling protocol after the tunnel is setup. The support of this table is optional. At transit LSRs, this table contains the actual hops traversed by the tunnel along its entire length if that information is available. This corresponds to the recorded path reported by the MPLS signalling protocol, possibly derived from multiple signaling messages.

For certain types of tunnels starting from some network devices (and in particular those starting from Cisco™ devices), data in the MIB tables for path information is not always complete. Embodiments combine available data from the MIB table(s) with network connectivity data to build the complete hop connectivity path of a tunnel.

Referring to FIG. 1, a method 100 according to one embodiment determines the input data available to compute the network connectivity by querying the MIB table(s) in step

110. As a result of such a query, one of two different scenarios may be identified; Either the MIB has only the CHop Table populated with data, or the MIB has both the ARHop Table and CHop Table populated with data. In both cases the Layer-2 (Data Link Layer, or "L2"), connectivity information is available from a Network Node Manager present in the network. Thus, in step 115, it is determined whether or not the ARHopTable is populated with data. If it is determined that the ARHopTable is not populated with data, the method proceeds to step 200 in which the available data from the CHop table is combined with the L2 connectivity information to compute one or more paths between nodes of the network.

If, on the other hand, it is determined that the ARHop Table is populated with data, the method proceeds to step 400 in which the available data from the ARHop Table and the CHop Table is combined with the Layer-2 connectivity information to compute one or more paths between nodes of the network.

Figure 2:
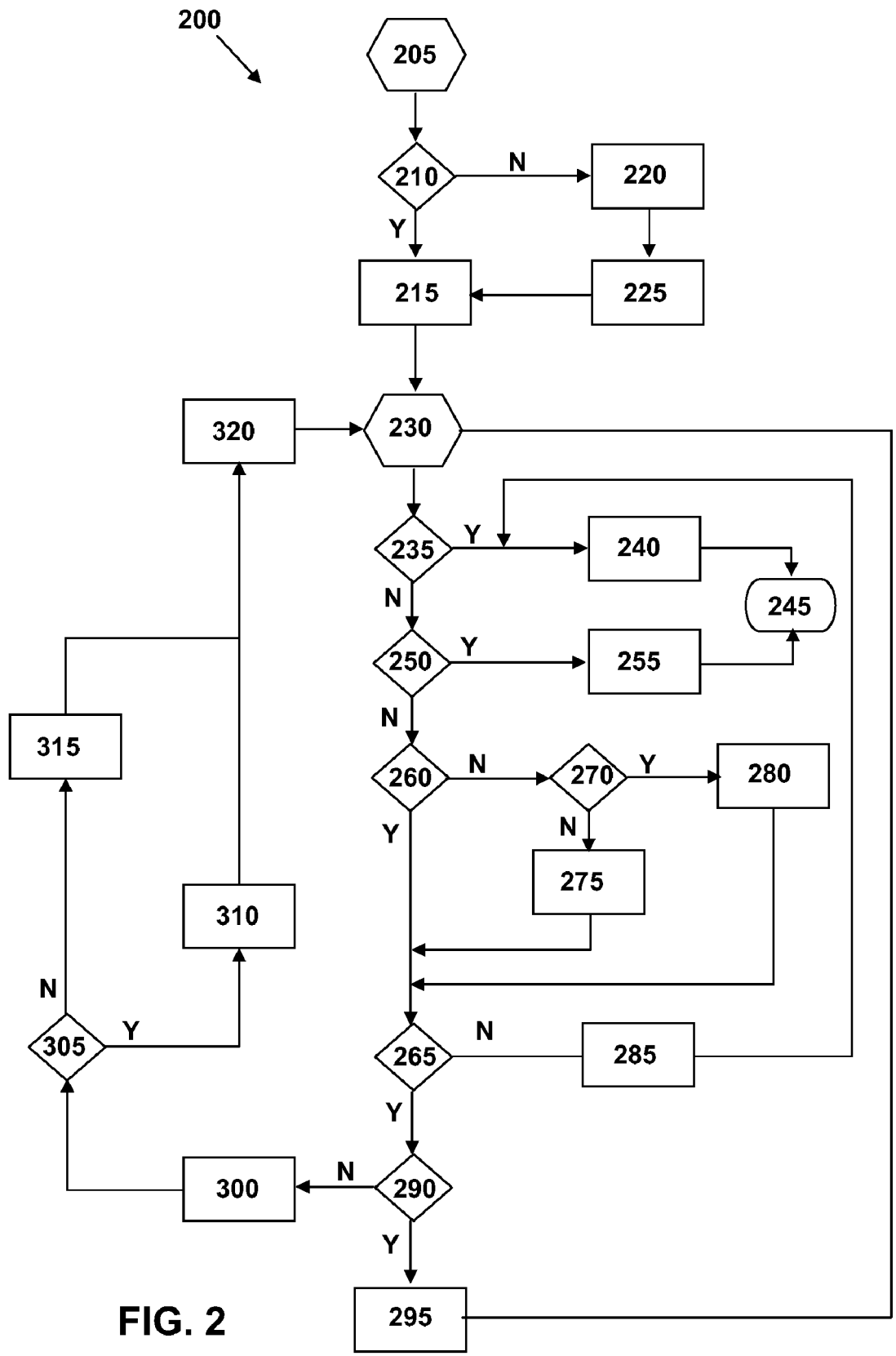
FIG. 2 is a flow diagram illustrating an embodiment of a method step of FIG. 1.

Referring now to FIG. 2, the method undertaken in step 200 will be described.

In step 205, the details about the first interface in the CHop Table is read. The method the proceeds to step 210 in which the algorithm attempts to determine the first egress interface of the tunnel by determining if the interface is connected to the head node. There are two possibilities;

a. This interface is connected to the head node—in which case the methods proceeds to step 215 and the interface is identified as the first ingress interface on the next hop; or b. The connectivity information is not available—in this case, the method proceeds to step 220, where the Stack MIB is read to confirm the first egress interface details, then to step 225, in which the Chop interface is added back in to the unprocessed list, and to step 215 where the first egress interface details (from step 220) are confirmed.

The method then proceeds to step 230 in which in the next interface in the CHop Table is read, before then proceeding to step 235 in which it is determined whether or not the last interface has been reached. Either it is determined (in step 235) that the last interface is reached, in which case the method proceeds to step 240 in which a tail node is added before ending the algorithm in step 245, or the method simply proceeds to step 250.

In step 250, it is determined whether or not the interface connects to a tail node. If it is determined that the interface connects to a tail node, the method proceeds to step 255, in which the interface connecting to the last node is identified and added as the last ingress interface, before ending the algorithm in step 245. Alternately, if it is determined that the interface does not connect to a tail node, the method proceeds to step 260.

In step 260, the connectivity of the interface with the previous node is checked. If that is satisfied then the interface is an ingress interface and the method proceeds to step 265. Otherwise, the method proceeds to step 270 in which node connectivity with a previous node is checked. If no node connectivity with a previous node is found, a gap in the path is identified in step 275 before proceeding to step 265. If node connectivity with a previous node is found, the ingress interface is obtained from the network node manager in step 280 before proceeding to step 265.

In step 265, it is determined whether or not the next interface can be obtained from the CHop Table. If not, the method proceeds to step 245 via steps 285 and 240 in which the interface is identified as an ingress interface and a tail node is added, respectively. If the next interface can be fetched from the CHop Table the two interfaces are checked (in step 290) to see if they reside on the same node. If so, then the first interface is identified as an ingress interface and the second interface is identified as an egress interface for the tunnel (step 295) and the method returns to step 230. If they are determined not to reside on the same node, the first interface is identified as an ingress interface in step 300, and the method then proceeds to step 305 where the second interface is checked to see if it resides on the next node, i.e. if it is connected to the node hosting the first interface.

If the second interface is found to reside on the next node, the method proceeds to step 310 where the second interface is identified as an ingress interface. If not, the method proceeds to step 315 instead and a gap in the path is identified. In either case, i.e. after completion of either step 310 or step 315, the second interface is put back into the interface list (step 320) so that it will be processed as part of the next pair of interfaces, and the method returns to step 230.

Figure 3:
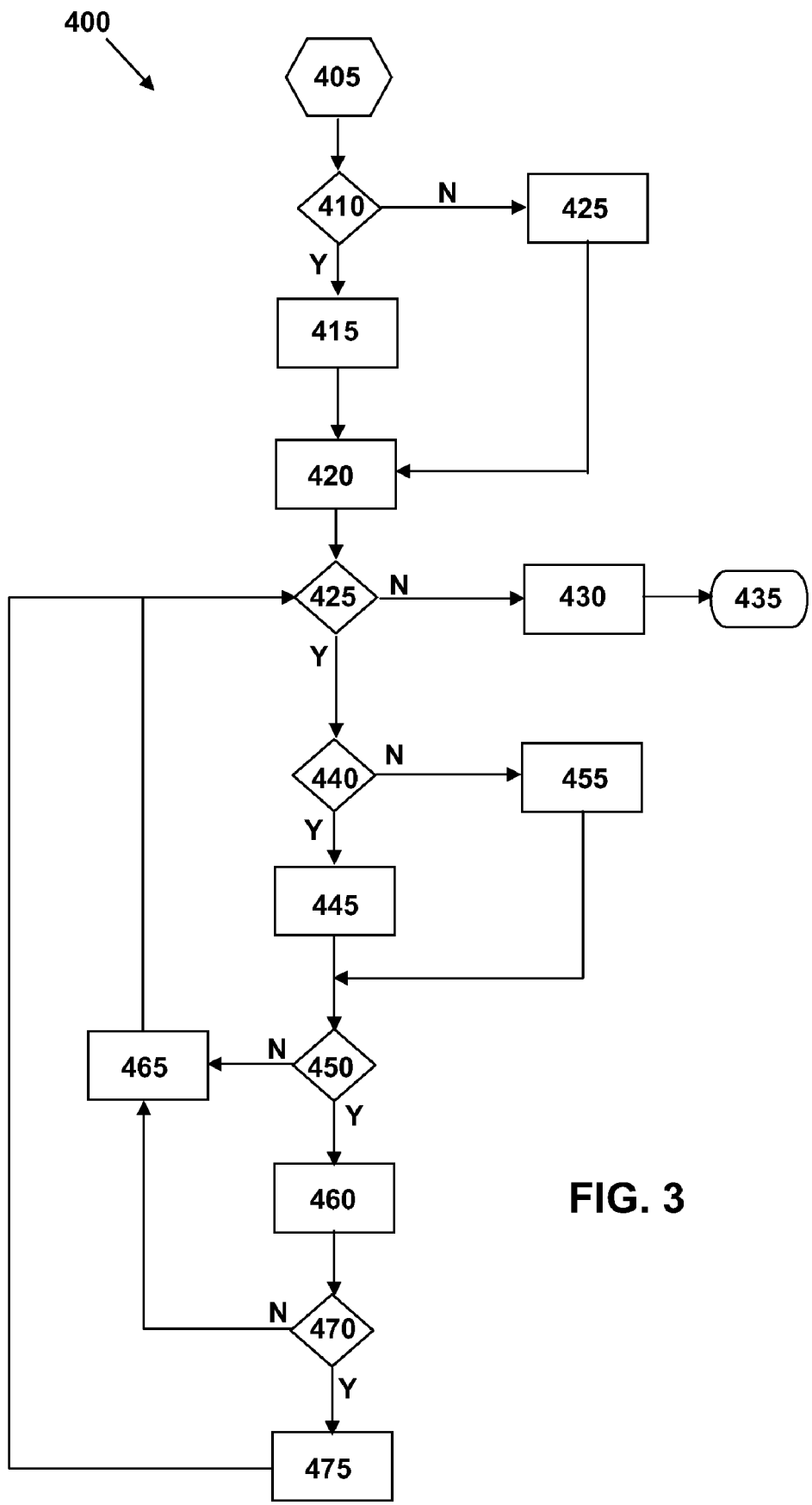
FIG. 3 is a flow diagram illustrating an embodiment of another method step of FIG. 1.

Referring now to FIG. 3, the method undertaken in step 400 will be described. The method 400 undertakes path computation of a tunnel using data from ARHop Table, CHop Table and Layer-2 connectivity information. The ARHop Table typically contains more reliable information, but data is only present if a flag (RecordRoute) is turned on for the tunnel by the network administrator.

In step 405, the details about the first interface in the CHop Table is read. The method the proceeds to step 410 in which the algorithm attempts to determine the first egress interface of the tunnel by determining if the interface is connected to the head node. There are two possibilities;

a. This interface is connected to the head node—in which case the methods proceeds to steps 415 and 420 where the interface is identified as the first ingress interface on the next hop (step 415) and the head node's interface is identified as the first egress interface (step 420); or b. The connectivity information is not available—in this case, the method proceeds to step 425, where the Stack MIB is read to confirm the first egress interface details, then to step 420 the first egress interface details (from step 425) are confirmed.

The methods then proceeds to step 425 in which it is determined whether or not there are remaining interfaces in the ARHop Table. Either it is determined (in step 425) that there are no more interfaces, in which case the method proceeds to step 430 in which a tail node is added before ending the algorithm in step 435, or the method simply proceeds to step 440.

In step 440, the connectivity of the interface from the ARHop Table with the previous node is checked. If that is satisfied then the method proceeds to step 445 in which the interface is identified an ingress interface before proceeding to step 450. Otherwise, if no node connectivity is identified, the method proceeds to step 450 via step 455 in which a gap in the path is identified.

In step 450, it is determined whether or not the interface is matched with an interface in the CHop Table. There are 2 possibilities:

a. If a match is found, the method proceeds to step 460 where next interface from the Chop Table is also read (if present).

b. If no match is found, the method proceeds to step 465 in which the egress interface is found using the Layer-2 connectivity information from the network node manager.

After completing step 460, it is checked (in step 470) whether or not the two interfaces in the CHop Table are residing on the same node. If so, they are marked as ingress and egress respectively in step 475, whereas if they do not reside on the same node, the method proceeds to step 465 in which the required Layer-2 connectivity information is obtained from the network node manager.

In either case, i.e. after completion of either step 465 or step 475, the method returns to step 425 and continues until it terminates by reaching step 435.

Embodiments described above have been implemented and tested against tunnels configured in a test network consisting of Cisco™ network nodes. Testing was done against three different types of tunnels: strict; partially strict; and dynamic. Also, the RecordRoute flag indicating the presence of ARHop Table data was set to true and false in order to enable and disable population of the ARHop Table. In all the cases, the algorithms handled the different levels of data availability extremely well and were able to generate tunnel paths which were extremely accurate.

Figure 4:
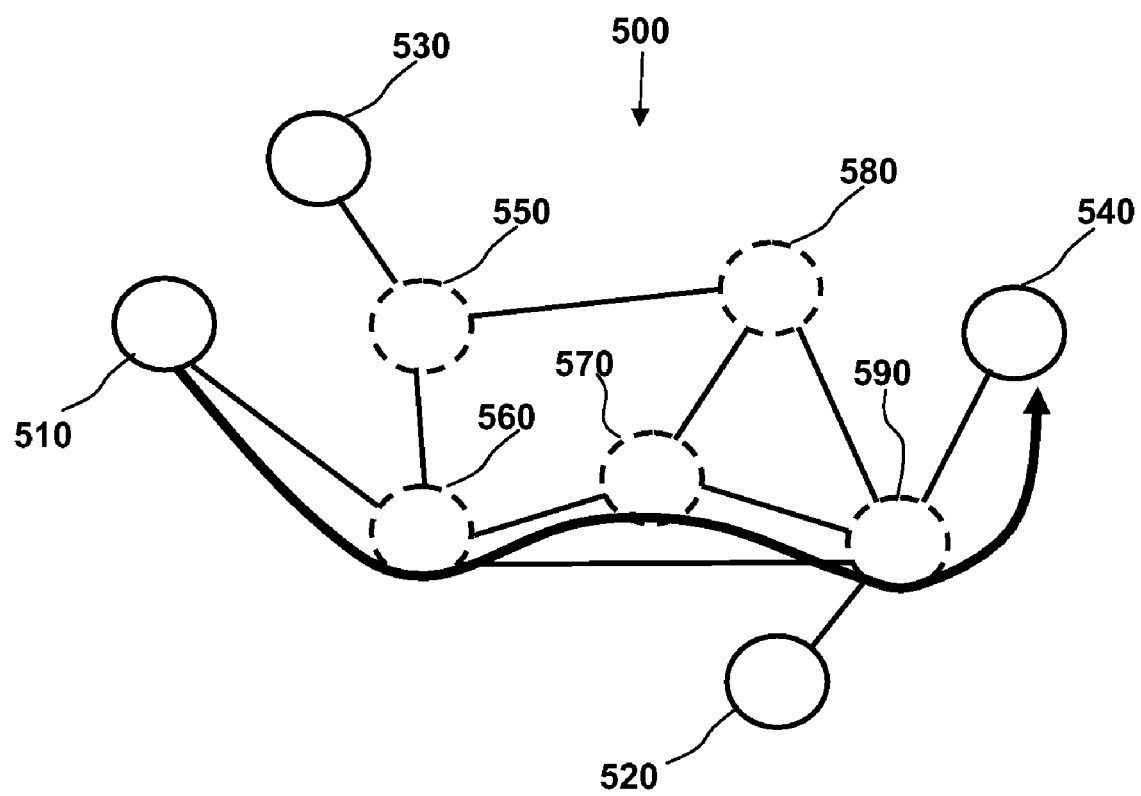
FIG. 4 is schematic diagram of a MPLS network within which an embodiment of the invention is implemented.

Referring to FIG. 4 there is shown a MPLS network 500 comprising first 510 to fourth 540 Provider Edge (PE) routers. The PE routers are MPLS Provider Edge Label Switch Routers (LSRs) which are present at the edge of the network 500. The PE routers 510, 520, 530, 540 provide connectivity to customer devices. The network 500 also comprises first 550 to fifth 590 Provider (P) routers which are MPLS LSRs present in the MPLS cloud communicating with each other and the PE routers 510, 520, 530, 540 to provide MPLS routing functionality.

The administrator can configure a Traffic Engineering tunnel (TE tunnel), as shown by the arrow labeled "A", so that MPLS traffic from one PE router (510) to another (540) is routed along this path (A). It will be appreciated that there are different types of configuration. For example, the tunnel can be configured such that all the routers are provided by configuration, or a part of the path is configured strictly and the rest is determined dynamically. There are also cases where the entire path (except for the originating and termination routers) is determined dynamically. Some tunnels can also be configured to be rerouted dynamically if a problem arises in the traffic flow.

Some of the advantages provided by MPLS TE tunnel path computation embodiments may be summarized as follows:

Different types of tunnels, such as strict, partially strict and dynamic tunnels, can be accommodated for. Each of these types leads to different tables being populated in the MIB. Embodiments are able to handle all such cases.

Embodiments can function even with incomplete data reported in the MIB. Multiple sources of information are intelligently combined, including those in more than one MIB table as well as Layer-2 connectivity information to derive a tunnel path.

Since the path of a tunnel is important to the operator and the network management system in terms of status monitoring and root cause analysis of problems, embodiments provide enhanced insight into the configuration and functioning of the tunnels.

Embodiments significantly improve path computation for traffic engineering tunnels in the case of missing path data.

It will be appreciated that embodiments significantly enhance hop computation accuracy for different types of tunnels, and can accommodate different levels of incomplete data reported in the MIB. More specifically:

Embodiments compute the complete ingress and egress interface list in the case where RecordRoute is true for the tunnel which leads to information being available in ARHop Table. They may also deal with the case where RecordRoute for the tunnel is set to false i.e. the ARHop Table in MIB does not report any data Also, embodiments are able to compute the hop even in the case of partially strict tunnels and dynamic tunnels. In this scenario the computed hops table is incomplete in the MIB and thus path information is missing.

While specific embodiments have been described herein for purposes of illustration, various other modifications will be apparent to a person skilled in the art and may be made without departing from the scope of the invention.

The invention claimed is:

1. A method for deriving a path of a traffic engineering tunnel in a network using Multi Protocol Label Switching, MPLS, traffic engineering and a Management Information Base, MIB, describing managed objects of the network, the method comprising:
   obtaining node connectivity information from the MIB;
   obtaining network connectivity information from a network node manager; and
   deriving tunnel path information based on the node connectivity information and the network connectivity information, wherein the tunnel path information is obtained from at least one of a first object describing actual hops traversed by a path between nodes of the network and a second object describing computed hops traversed by a path between nodes of the network, wherein deriving tunnel path connectivity information comprises:
   determining if the second object is present in the MIB; and
   if it is determined that the second object is present in the MIB, obtaining information from the second object in preference to obtaining information from the first object.

2. A method according to claim 1, wherein at least one of the first and second objects is an MPLS tunnel hop table according to the Structure of Management Information, SMI, standard.

3. A method according to claim 1, wherein the network connectivity information comprises layer-two, L2, connectivity information regarding the data link layer of the network.

4. A method according to claim 1, wherein the step of deriving tunnel path information comprises combining information from different sources in the network.

5. A network management system adapted to derive a path of a traffic engineering tunnel in a network using Multi Protocol Label Switching, MPLS, traffic engineering and a Management Information Base, MIB, describing managed objects of the network, the network management system comprising:
   a network node manager providing network connectivity information, wherein tunnel path information is derived based on the network connectivity information and node connectivity information obtained from the MIB, and the tunnel path information is obtained from at least one of a first object describing actual hops traversed by a path between nodes of the network and a second object describing computed hops traversed by a path between nodes of the network, wherein deriving tunnel path connectivity information comprises:
   determining if the second object is present in the MIB; and
   if it is determined that the second object is present in the MIB, obtaining information from the second object in preference to obtaining information from the first object.

6. A network management system according to claim 5, wherein the managed objects of the MIB are defined according to SMI standard.

7. A network management system according to claim 5, wherein the MIB is implemented at the head end of the network.

8. A computer program stored on a non-transitory computer readable storage medium having instructions that, when executed by a computing platform, result in execution of a method comprising:
- obtaining node connectivity information from a Management Information Base, MIB, describing managed objects of a network using Multi Protocol Label Switching, MPLS, traffic engineering;
- obtaining network connectivity information from a network node manager; and
- deriving tunnel path information based on the node connectivity information and the network connectivity information, wherein the tunnel path information is obtained from at least one of a first object describing actual hops traversed by a path between nodes of the network and a second object describing computed hops traversed by a path between nodes of the network, wherein deriving tunnel path connectivity information comprises:
- determining if the second object is present in the MIB; and
- if it is determined that the second object is present in the MIB, obtaining information from the second object in preference to obtaining information from the first object.

* * * * *